(12) United States Patent
Agirman

(10) Patent No.: US 12,719,301 B2
(45) Date of Patent: Aug. 25, 2026

(54) BATTERY-BASED ACTIVE MAGNETIC BEARING SYSTEM AND A POWER SUPPLY CIRCUIT THEREOF

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 11 days.

(21) Appl. No.: 19/057,099

(22) Filed: Feb. 19, 2025

(65) Prior Publication Data

US 2025/0293540 A1 Sep. 18, 2025

Related U.S. Application Data

(60) Provisional application No. 63/566,022, filed on Mar. 15, 2024.

(51) Int. Cl.
*H02J 50/12* (2016.01)
*H01M 10/44* (2006.01)
(Continued)

(52) U.S. Cl.
CPC ................ *H02J 9/061* (2013.01); *H02J 7/02* (2013.01); *H02J 7/61* (2026.01); *H02J 7/65* (2026.01);
(Continued)

(58) Field of Classification Search
CPC ...... H02J 9/061; H02J 7/02; H02J 7/61; H02J 7/65; H02J 7/855; H02J 9/06; H02K 7/09;
(Continued)

(56) References Cited

U.S. PATENT DOCUMENTS 11,280,524 B2 3/2022 Slothower et al.
11,689,144 B2 6/2023 Kim et al.
(Continued)

FOREIGN PATENT DOCUMENTS

CN 103701336 B 8/2016
CN 112039190 A 12/2020
(Continued)

OTHER PUBLICATIONS

Extended European Search Report received for EP Application No. 25163265.9, mailed on Apr. 8, 2025, 11 Pages.

*Primary Examiner* — Elim Ortiz
(74) *Attorney, Agent, or Firm* — Drew Folgmann

(57) ABSTRACT

A power supply circuit for a magnetic bearing system comprises a power convertor configured to be electrically connected to an alternating current (AC) power source, an inverter configured to be electrically connected between the power convertor and a motor associated with the HVAC system, and a battery, an input side of the battery electrically connected to a direct current (DC) bus configured between the power convertor and the inverter, and an output side of the battery electrically connected to one or more electromagnetic bearings and a magnetic bearing control drive associated with the motor or the magnetic bearing system, wherein the battery is configured to receive and store a portion of the DC electrical power. The battery is configured to supply the stored electrical power to the electromagnetic bearings and the magnetic bearing control drive in an event of failure of supply of electrical power to the motor.

20 Claims, 3 Drawing Sheets

(51) Int. Cl.

| | |
|---|---|
| ***H02J 7/00*** | (2006.01) |
| ***H02J 7/02*** | (2016.01) |
| ***H02J 7/61*** | (2026.01) |
| ***H02J 7/65*** | (2026.01) |
| ***H02J 9/06*** | (2006.01) |
| ***H02K 7/08*** | (2006.01) |
| ***H02K 7/09*** | (2006.01) |
| ***H02M 1/00*** | (2006.01) |
| ***H02M 5/458*** | (2006.01) |

(52) U.S. Cl.
CPC ................ *H02J 7/855* (2026.01); *H02K 7/09* (2013.01); *H02M 1/0087* (2021.05); *H02M 5/4585* (2013.01)

(58) Field of Classification Search
CPC .... H02M 1/0087; H02M 5/4585; H02M 3/00; H02M 7/483; H02M 7/797; F16C 2362/52; F16C 32/0442; F16C 32/0457; H02P 27/085
See application file for complete search history.

(56) References Cited

U.S. PATENT DOCUMENTS

| | | | | |
|---|---|---|---|---|
| 2015/0219378 | A1 | 8/2015 | Crane et al. | |
| 2023/0324972 | A1 | 10/2023 | Huaiya et al. | |
| 2024/0128776 | A1* | 4/2024 | Majd | H02J 7/865 |

FOREIGN PATENT DOCUMENTS

| | | | |
|---|---|---|---|
| CN | 111173836 | B | 6/2021 |
| CN | 115800334 | A | 3/2023 |
| CN | 116696946 | A | 9/2023 |
| EP | 0430009 | B1 | 8/1994 |
| JP | H07-293563 | A | 11/1995 |
| JP | 2791515 | B2 | 8/1998 |
| JP | 3074286 | B2 | 8/2000 |
| JP | 2002180990 | A | 6/2002 |
| JP | 2003021141 | A | 1/2003 |
| KR | 10-2530374 | B1 | 5/2023 |
| KR | 10-2579780 | B1 | 9/2023 |
| WO | 2022121332 | A1 | 6/2022 |

* cited by examiner

BATTERY-BASED ACTIVE MAGNETIC BEARING SYSTEM AND A POWER SUPPLY CIRCUIT THEREOF

CROSS-REFERENCE TO RELATED APPLICATION

This patent application claims the benefit of U.S. Provisional Patent Application No. 63/566,022, filed on Mar. 15, 2024, which is incorporated by reference herein in its entirety.

BACKGROUND

The subject disclosure relates to the field of magnetic bearing systems, and more particularly, to a battery-based magnetic bearing system and a power supply circuit for the magnetic bearing system.

SUMMARY

Described herein is a power supply circuit for a magnetic bearing system associated with a heating, ventilation, and air conditioning (HVAC) system. The power supply circuit comprises a power convertor configured to be electrically connected to an alternating current (AC) power source, the power convertor configured to convert AC electrical power supplied by the power source into a direct current (DC) electrical power having first electrical attributes, an inverter configured to be electrically connected between the power convertor and a motor associated with the HVAC system, the inverter configured to convert the DC electrical power supplied by the power convertor into another AC electrical power having second electrical attributes and correspondingly supply the another AC electrical power to the motor, and a battery, an input side of the battery electrically connected to a DC bus configured between the power convertor and the inverter, and an output side of the battery electrically connected to one or more electromagnetic bearings and a magnetic bearing control drive associated with the motor or the magnetic bearing system, wherein the battery is configured to receive and store at least a portion of the DC electrical power, wherein the battery is configured to supply the stored electrical power to the electromagnetic bearings and the magnetic bearing control drive in an event of failure of supply of electrical power to the motor.

In one or more embodiments, when the AC power source is in a healthy state, the power supply circuit is configured to enable supply of the another AC electrical power to the motor and/or supply the DC electrical power to the battery.

In one or more embodiments, the power convertor is a rectifier, an input side of the rectifier being configured to be electrically connected to the AC power source, and an output side of the rectifier being configured to be electrically connected to an input side of the inverter and the input side of the battery via the DC bus.

In one or more embodiments, the power supply circuit further comprises a DC-DC convertor electrically configured between the output side of the battery, and the electromagnetic bearings and the magnetic bearing control drive, wherein the DC-DC convertor is configured to convert the electrical power stored in the battery into a third DC electrical power having third electrical attributes for the electromagnetic bearings and the magnetic bearing control drive.

In one or more embodiments, the power supply circuit comprises another DC-DC convertor electrically configured between the input side of the battery and the DC bus connecting the power convertor and the inverter.

In one or more embodiments, the another DC-DC convertor is a bi-directional DC-DC convertor that is configured to enable the supply of electrical power between the power source and the battery, and further enable supply of electrical power between the motor and the battery via the inverter.

In one or more embodiments, the power convertor is a bi-directional AC to DC convertor that is configured to convert the AC electrical power supplied by the power source into the DC electrical power for the battery and/or the inverter, and further convert the electrical power stored in the battery and/or electrical power generated by the motor into the AC electrical power for the AC power source.

In one or more embodiments, the DC-DC convertor is operated in a voltage source mode, and wherein the second DC-DC convertor is operated in a current source mode.

In one or more embodiments, the power supply circuit comprises a transformer configured between the power convertor and the AC power source to step-up or step-down the AC electrical power supplied by the AC power source for the power convertor.

In one or more embodiments, the output side of the battery is configured to be electrically connected to one or more components associated with the HVAC system, and wherein the motor is associated with a compressor or one or more fans associated with the HVAC system.

In one or more embodiments, the power supply circuit comprises a solar power module operatively coupled to the motor and the battery, wherein the solar power module is configured to supply DC electrical power to the motor and the battery.

Also described herein is a battery-based magnetic bearing system. The system comprises one or more electromagnetic bearings and a magnetic bearing control drive configured with a motor, a power supply circuit configured with the motor, the electromagnetic bearings, and magnetic bearing control drive, wherein the power supply circuit comprises a power convertor electrically connected to an AC power source, the power convertor configured to convert AC electrical power supplied by the power source into a DC electrical power having first electrical attributes, an inverter electrically connected between the power convertor and the motor, the inverter configured to convert the first DC electrical power supplied by the power convertor into another AC electrical power having second electrical attributes and correspondingly supply the another AC electrical power to the motor, and a battery, an input side of the battery being electrically connected to a DC bus configured between the power convertor and the inverter, and an output side of the battery electrically connected to the electromagnetic bearings and the magnetic bearing control drive, wherein the battery is configured to receive and store at least a portion of the DC electrical power; and a controller in communication with the motor, the electromagnetic bearings and the magnetic bearing control drive, and the power supply circuit, wherein the controller is configured to enable supply of the stored electrical power to the electromagnetic bearings and the magnetic bearing control drive in an event of failure of supply of electrical power to the motor In one or more embodiments, when the AC power source is in a healthy state, the controller enables the power supply circuit to supply AC electrical power to the motor and/or supply DC electrical power to the battery to store electrical power in the battery.

In one or more embodiments, the power convertor is a rectifier, an input side of the rectifier being electrically connected to the AC power source, and an output side of the rectifier being configured to be electrically connected to an input side of the inverter and the input side of the battery via the DC bus.

In one or more embodiments, the power supply circuit comprises a DC-DC convertor electrically configured between the output side of the battery, and the electromagnetic bearings and the magnetic bearing control drive, wherein the DC-DC convertor is configured to convert the electrical power stored in the battery into another DC electrical power having third electrical attributes for the electromagnetic bearings and the magnetic bearing control drive.

In one or more embodiments, the power supply circuit comprises another DC-DC convertor electrically configured between the input side of the battery and the DC bus connecting the power convertor and the inverter.

In one or more embodiments, the another DC-DC convertor is a bi-directional DC-DC convertor that is configured to enable the supply of electrical power between the power source and the battery, and further enable supply of electrical power between the inverter and the battery.

In one or more embodiments, the power convertor is a bi-directional AC to DC convertor that is configured to convert the AC electrical power supplied by the power source into the DC electrical power for the battery and/or the inverter, and further convert the electrical power stored in the battery and/or electrical power generated by the motor into the AC electrical power for the AC power source.

In one or more embodiments, the controller is configured to operate the DC-DC convertor in a voltage source mode, and operate the another DC-DC convertor in a current source mode.

In one or more embodiments, the controller is configured to adjust the supply of electrical power from the power source to the battery to a corresponding threshold level based on a request raised by the power source.

In one or more embodiments, the controller is configured to limit the supply of electrical power from the power source to the battery to a corresponding threshold level upon detecting the power consumption by the HVAC system and/or the magnetic bearing system to exceed the corresponding threshold level.

In one or more embodiments, the controller is configured to enable the supply of electrical power from the power source to the battery to charge the battery upon detecting an energy supply demand of the HVAC system and/or the magnetic bearing system to be below a corresponding threshold value, and enable the supply of the electrical power stored in the battery to the HVAC system and/or the magnetic bearing system upon detecting the energy supply-demand to be above the corresponding threshold value.

In one or more embodiments, the controller is configured to enable the supply of electrical power from the power source to the battery upon detecting an energy tariff of the power source to be below a tariff threshold value, and restrict the supply of electrical power from the power source to the battery upon detecting the energy tariff of the power source to be above the tariff threshold value.

The foregoing summary is illustrative only and is not intended to be in any way limiting. In addition to the illustrative aspects, embodiments, and features described above, further aspects, embodiments, features, and techniques of the subject disclosure will become more apparent from the following description taken in conjunction with the drawings.

BRIEF DESCRIPTION OF THE DRAWINGS

The accompanying drawings are included to provide a further understanding of the subject disclosure and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In heating, ventilation, and air conditioning (HVAC) systems, compressors or fans are typically powered by electric motors. These motors conventionally feature a design where a stator encases a rotating shaft, which is supported by mechanical bearings maintaining direct physical contact with the shaft. However, advancements have led to the adoption of high-speed motors utilizing magnetic bearings instead of mechanical ones. Unlike their mechanical counterparts, magnetic bearings support the rotating shaft without any physical contact by levitating it in mid-air through a magnetic field generated by electromagnetic bearings. Motors equipped with magnetic bearings are powered via a dedicated power supply circuit or device.

The power supply circuit for such motors often comprises a rectifier, a power factor controller, and an inverter-type power transformation unit. Under normal operations, alternating current (AC) voltage from the main power supply is converted to direct current (DC) by the rectifier. This DC voltage is then fed into the inverter, which converts it back to AC to drive the motor. However, to ensure the continuous operation of magnetic bearings, especially during power outages, a reliable power supply system is important.

To address power reliability, an uninterruptible power supply (UPS) is commonly integrated into the power supply circuit for magnetic bearing systems. A UPS is designed to provide immediate backup power, ensuring that magnetic bearings remain functional during power interruptions. Despite their effectiveness, UPS systems are known for being costly and requiring periodic maintenance.

There is therefore a need to provide an improved, efficient, and reliable solution to overcome the above-mentioned drawbacks, limitations, and shortcomings associated with existing magnetic bearing systems and associated power supply circuit.

Figure 1:
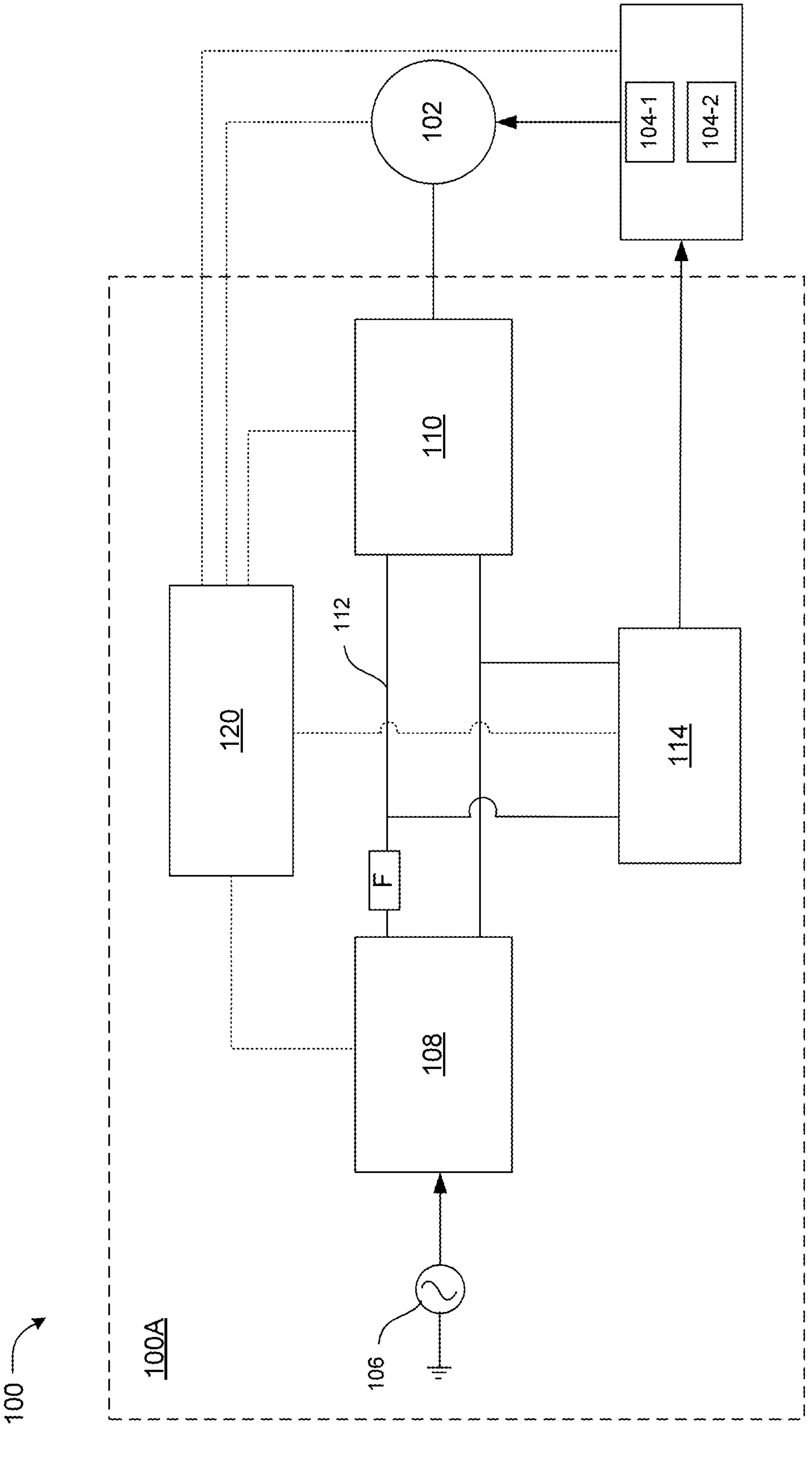
FIG. 1 illustrates an exemplary block diagram of a batter-based magnetic bearing circuit and its associated power supply circuit in accordance with one or more embodiments of the subject disclosure.
Figure 2:
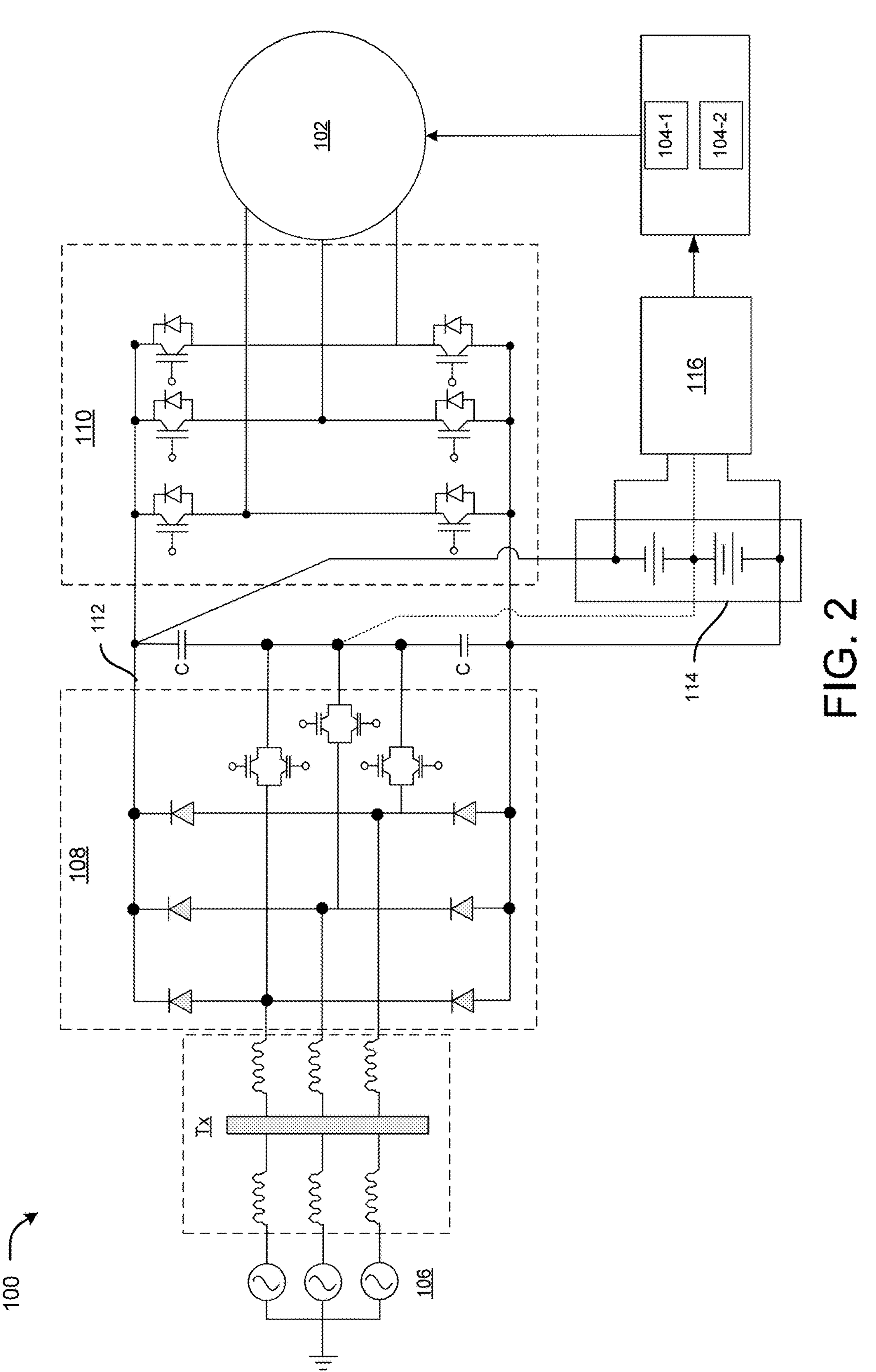
FIG. 2 illustrates an exemplary circuit diagram of an embodiment of the battery-based active magnetic bearing system of FIG. 1, in accordance with one or more embodiments of the subject disclosure.
Figure 3:
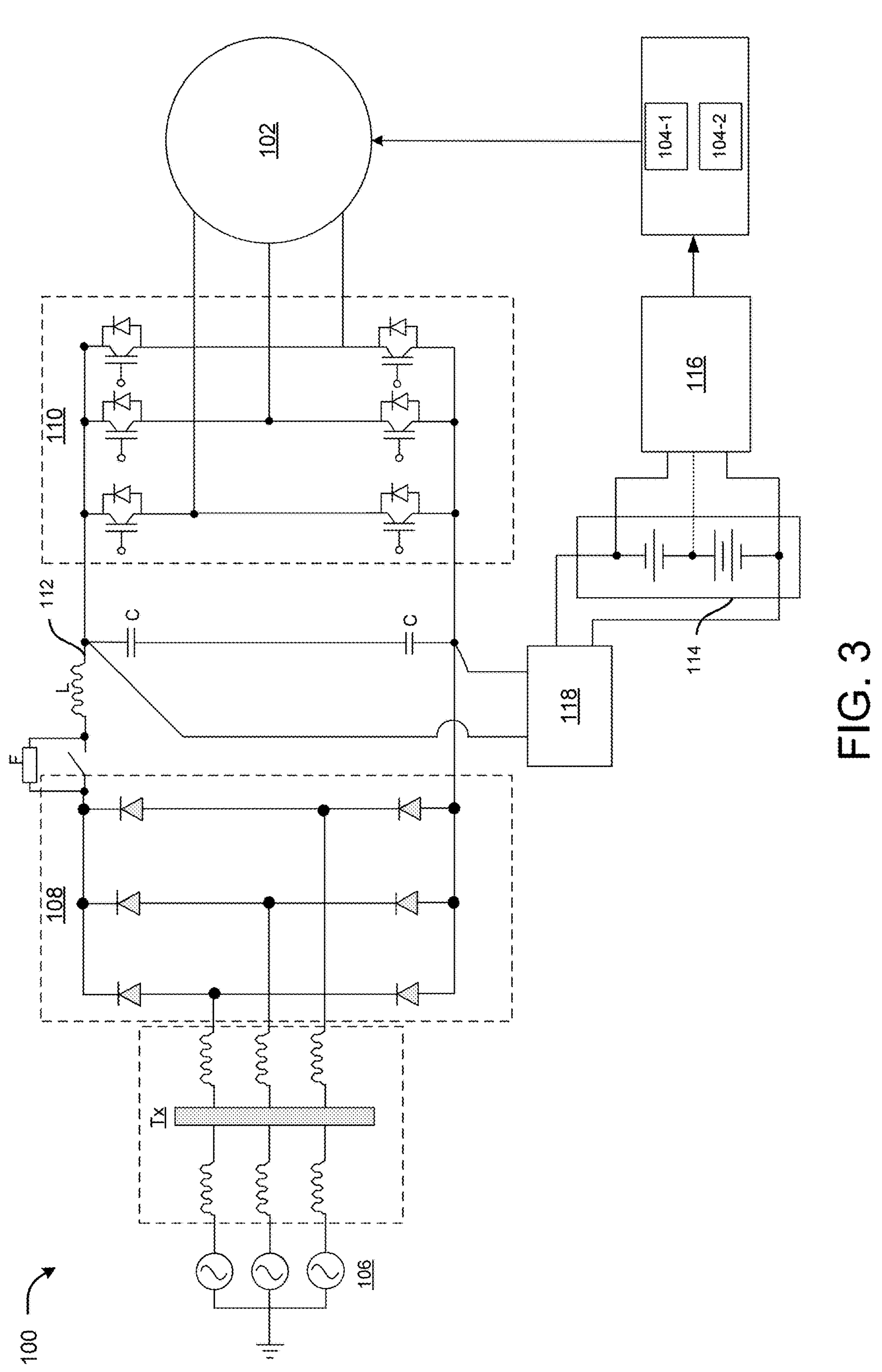
FIG. 3 illustrates an exemplary circuit diagram of an embodiment of the battery-based active magnetic bearing system of FIG. 1, in accordance with one or more embodiments of the subject disclosure.

Referring to FIGS. 1 to 3, the battery-based magnetic bearing system (MBS) (also referred to as a system or an MBS, hereinafter) 100 for a heating, ventilation, and air conditioning (HVAC) system is disclosed. In one or more embodiments, the MBS 100 may include a motor 102 that includes a rotor rotatably mounted within a housing, one or more electromagnetic bearings 104-1 (which constitute a stator of the motor 102) disposed around the rotor, and a plurality of position sensors for detecting the position of the rotor. Further, the MBS 100 may include a magnetic bearing control drive 104-2 operatively coupled to the position sensors and the electromagnetic bearings 104-1 being disposed around the rotor. In one or more embodiments, (not shown) the rotor of the motor or MBS 102 may be further connected to a compressor or a fan associated with the HVAC system to drive the corresponding compressor or fan.

The MBS 100 may further include or may be configured with a power supply circuit 100A that can be electrically connected to the motor 102, the electromagnetic bearings 104-1, and the magnetic bearing control drive 104-2 associated with the MBS 100 to supply electrical power for the operation of the motor 102 and MBS 100. In one or more embodiments, the power supply circuit 100A (also referred to as power supply circuit 100A, herein) may include an AC-DC power convertor 108 (also referred to as power convertor 108, herein) configured to be electrically connected to an AC power source 106, such as but not limited to an electric grid or a fuel-powered AC power generator. In one or more embodiments, the power convertor 108 may be configured to convert AC electrical power supplied by the power source 106 into a (first) direct current (DC) electrical power having first electrical attributes.

The power supply circuit 100A may further include an inverter 110 configured to be electrically connected between the power convertor 108 and the motor 102, where the power convertor 108 and the inverter 110 may be electrically connected by a DC bus 112. In addition, the power supply circuit 100A may include a set of batteries (collectively referred to as battery 114, herein), having an input side thereof electrically connected to the DC bus 112, and an output side thereof electrically connected to the electromagnetic bearings 104-1 and the magnetic bearing control drive 104-2 associated with the motor 102 or the MBS 100.

In one or more embodiments, referring to FIGS. 2 and 3, the AC-DC power convertor 108 may be a rectifier where an input side of the rectifier may be electrically connected to the AC power source 106, and an output side of the rectifier may be electrically connected to an input side of the inverter 110 and the input side of the battery 114 via the DC bus 112, However, in some embodiments, the power convertor 108 may also be a bi-directional AC-DC convertor that may enable bi-directional flow of electrical power between the power supply circuit 100A and the AC power source 106, which may enable supply of excess electrical power available in the power supply circuit 100A back to the AC power source 106 (electrical grid).

In one or more embodiments, the power supply circuit 100A may also include a transformer (Tx) configured between the power convertor 108 and the AC power source 106 to step-up or step-down the AC electrical power supplied between the AC power source 106 and the power convertor 108. Further, in one or more embodiments, the power supply circuit 100A may additionally/optionally include a filter (F) configured at the output side of the power convertor 108/rectifier to remove or filter harmonics from the DC power supplied by the power convertor 108 to the DC bus 112. This harmonic free output at the DC bus 112 may allow the use of smaller capacity batteries in the power supply circuit 100A or MBS 100.

Referring to FIG. 2, in one or more embodiments, the rectifier/power convertor 108 may be a Vienna rectifier. The Vienna rectifier is a three-phase, three-level pulse width modulation (PWM) power conversion system, constructed using insulated gate bipolar transistors (IGBTs) paired with anti-parallel diodes, and additional diodes on the DC link to facilitate three-level operation (positive, zero, and negative voltage levels). This configuration is split the DC output into two capacitors (C) in series, creating a midpoint for zero voltage level generation.

Referring to FIG. 3, in one or more embodiments, the power convertor 108 may be a 3-phase bridge rectifier or a six-pulse rectifier. The 3-phase bridge rectifier may include six diodes, arranged in a bridge configuration, allowing for the conversion of both the positive and negative halves of the AC input waveform into a pulsating DC output to ensure full-wave rectification of the AC input, capitalizing on the three-phase power's inherent continuity and phase overlap to reduce output ripple. The diodes are oriented in such a way that for each half-cycle of the AC input, two diodes conduct in series (one from the upper group of three and one from the lower group of three) for each phase, effectively allowing current to flow through the load in one direction only. The output of the rectifier 108 may be further smoothened using the filter F (typically a capacitor C or an inductor-capacitor L-C combination) to reduce the ripple voltage and achieve a more stable DC output.

Referring to FIGS. 2 and 3, in one or more embodiments, the inverter 110 man be implemented using six IGBTs to efficiently convert DC output of the rectifier 108 or battery 114 into AC electrical power for the motor 102. Structured in a three-phase bridge configuration, the design of the inverter 110 incorporates three legs, each with two series-connected IGBTs, facilitating the conversion by generating a pseudo-sinusoidal AC output. The IGBTs may be controlled via PWM techniques, adjusting the duty cycle of their switching signals to modulate the output voltage's amplitude and frequency. This method allows for the simulation of a three-phase AC sine wave, which may be important for the operation of the motor 102.

Further, in one or more embodiments, the inverter 110 may be configured to convert the (first) DC electrical power (harmonics free) supplied by the power convertor 108 into another AC electrical power having second electrical attributes and correspondingly supply the another AC electrical power to the motor 102.

In one or more embodiments, referring back to FIGS. 1 to 3, the power supply circuit 100A may include a (first) DC-DC convertor 116 electrically configured between the output side of the battery 114, the electromagnetic bearings 104-1, and the magnetic bearing control drive 104-2. The first DC-DC convertor 116 may be configured to convert the electrical power stored in the battery 114 into another (or second) DC electrical power having third electrical attributes for the electromagnetic bearings 104-1 and the magnetic bearing control drive 104-2. The electrical rating of the first DC-DC convertor 116 may be selected based on the power ratings of the battery 114, the electromagnetic bearings 104-1, and the magnetic bearing control drive 104-2 associated with the motor 102, to keep the MBS 100 safe from any electrical failure or overheating.

As stated, the power convertor 108 may be configured to convert AC electrical power (3-phase or single phase) supplied by the power source 106 into the (first) DC electrical power having the first electrical attributes. The filter F may then remove harmonics from the DC power supplied by the power convertor 108 to the DC bus 112. Further, the battery 114 may be configured to receive and store at least a portion of the DC electrical power supplied by the power convertor 108 (rectifier 108). In one or more embodiments, the (first and/or second) electrical attributes may include amplitude, frequency, phase difference, power factor, and the like associated with the electrical power.

In one or more embodiments, when the AC power source 106 is in a healthy state or normal conditions, the power supply circuit 100A may enable supply of the electrical power to the motor 102 via the rectifier 108 and inverter 110 to run the motor 102 and/or further supply a portion of the first DC electrical power from the DC bus 112 to the battery 114 to store electrical power in the battery 114. In the healthy state, the AC power source 106 remains available and may be free from voltage or power fluctuations that may be induced onto the AC power source 106 due to lightning strikes, load shedding, power demand fluctuations, and the like.

Further, in one or more embodiments, in the event of failure of supply of electrical power to the motor 102 or when the AC power source 106 is unavailable, the power supply circuit 100A may enable the battery 114 and the first DC-DC convertor 116 to supply the stored electrical power available in the battery 114 to the electromagnetic bearings 104-1 and the magnetic bearing control drive 104-2 to keep the MBS 100 operational.

In one or more embodiments, referring back to FIG. 3, the power supply circuit 100A may include a second/another DC-DC convertor 118 (also referred to as high-power DC-DC convertor) electrically configured between the input side of the battery 114 and the DC bus 112 connecting the power convertor 108 and the inverter 110. The second DC-DC convertor 118 may be configured to adjust attributes of the electrical power supplied from the DC bus 112 (either from the power source/rectifier side or the motor/inverter side) to the battery 114, based on electrical rating and capacity of the battery 114. This may help prevent overcharging, overheating, and failure of the battery 114.

In one or more embodiments, the second DC-DC convertor 118 of FIG. 3 may be a bi-directional DC-DC convertor that may be configured to enable the supply of electrical power between the power source 106 and the battery 114, and further enable the supply of electrical power between the motor 102 and the battery 114 via the inverter 110. Further, in some embodiments, the power convertor 108 may be a bi-directional AC to DC convertor that may be configured to convert the AC electrical power supplied by the power source 106 into the (first) DC electrical power for the battery 114 and/or the inverter 110.

The bi-directional AC to DC convertor may further convert the DC electrical power stored in the battery 114 and/or the electrical power supplied by the motor 102 (in a regenerative mode) into the AC electrical power for the AC power source 106. Accordingly, the power supply circuit 100A may enable the supply of electrical power from the AC power source 106 to the motor 102, the battery 114, and other components of the HVAC system in normal condition. Further, the power supply circuit 100A may also enable the supply of electrical power back to the AC power source 106 (electrical grid) from the motor 102 (in a regenerative mode) side and the battery side 114.

The bi-directional power supply capability of the power supply circuit 100A or MBS 100 may ingeniously serve as an energy management device that can work in tandem with the utility grid 106 (power source), particularly within Smart Grid technology. The subject disclosure enables a dynamic demand response strategy, effectively managing and reducing the power drawn from the grid 106 during peak demand periods. This can be achieved by leveraging the energy stored in battery 114 to compensate for the reduction in grid power consumption. Such a mechanism not only alleviates the strain on the grid 106 but also ensures a more stable and efficient energy supply.

Additionally, the subject disclosure can facilitate the implementation of time-of-use strategies, allowing for the strategic charging of battery 114 during periods of low demand (or when energy prices are at their lowest) and utilizing this stored energy when the demand (or energy prices) spikes. This concept, known as load shifting, is important in optimizing energy costs and enhancing grid resilience.

Accordingly, the subject disclosure can integrate battery storage within active magnetic bearing systems with the advanced functionalities of Smart Grid technology, such as demand response, peak shaving, and time-of-use energy pricing. While the primary role of battery 114 may be to support the operation of magnetic bearing systems 100, the enhanced capacity and efficient management of battery 114 can enable it to play an important role in the broader energy management strategy. The subject disclosure can help manage energy in smart and efficient ways by making the HVAC system use less power when the grid 106 needs it, which is called demand response. Secondly, the subject disclosure can prevent using too much power during busy times, known as peak shaving, even if grid 106 does not specifically ask for it. Lastly, the subject disclosure can use a strategy called time-of-use, where it can charge the battery 114 when energy is cheap and use/sell the stored energy when demand is high or prices are up. These options allow the subject disclosure to support the active MBS 100 to work well and also help keep the grid 106 stable and save money on energy bills.

In one or more embodiments, the MBS 100 may include a controller 120 in communication with the components of the power supply circuit 100A, the motor 102, the battery 114, the electromagnetic bearings 104-1 and the magnetic bearing control drive 104-2, and one or more components of the HVAC system. In one or more embodiments, the controller 120 may be configured to enable the supply of the electrical power stored in the battery 114 to the electromagnetic bearings 104-1 and the magnetic bearing control drive 104-2 in the event of a failure of electrical power supply to the motor 102. Further, in other embodiments, when the AC power source 106 is in a healthy state, the controller 120 may enable the power supply circuit 100A to supply DC electrical power to the motor 102 to run the motor 102 and/or to the battery 114 to store electrical power in the battery 114. In one or more embodiments, the controller 120 may be configured to operate the (first) DC-DC convertor 116 in a voltage source mode, and the second/another DC-DC convertor 118 in a current source mode.

In one or more embodiments, the controller 120 may be configured to adjust the supply of electrical power from the power source (grid) 106 to the battery 114 to a (first) corresponding threshold level based on a request raised by the power source 106. Accordingly, the MBS 100 may respond to the grid (power source) 106 by reducing power drawn therefrom by the requested amount.

In addition, the controller 120 may be configured to determine a utility demand associated with the HVAC system. Based on the utility demand, the controller 120 may be configured to meet the utility demand partially through the electrical power stored in the battery 114 and partially through the AC power source 106 or both based on the peak demand associated with the utility demand. In one or more embodiments, the controller 120 may be configured to enable the supply of electrical power from the power source 106 to the battery 114 to charge the battery 114 upon detecting an energy supply demand of the HVAC system and/or the MBS 100 to be below a corresponding threshold value. The controller 120 can further enable the supply of the electrical power stored in the battery 114 to the HVAC system and/or the MBS 100 upon detecting the energy supply-demand to be above the corresponding threshold value.

In one or more embodiments, the controller 120 may be further configured to limit the supply of electrical power from the power source 106 to the battery 114 to a (second) corresponding threshold level upon detecting the power consumption by the HVAC system and/or the MBS 100 to exceed the (second) corresponding threshold level.

Further, in one or more embodiments, the controller 120 may be configured to enable the supply of electrical power from the power source (grid) 106 to the battery 114 upon detecting an energy tariff of the power source 106 to be below a tariff threshold value, and restrict the supply of electrical power from the power source 106 to the battery 114 upon detecting the energy tariff of the power source to be above the tariff threshold value.

Accordingly, the battery 114 may facilitate peak power shaving, when the power demand has an uneven load profile. The electrical power stored in the battery 114 during normal conditions may be used to compensate for the additional power needed during peak power shaving. Further, when the power demand falls within a specific load profile, the battery 114 may be recharged. Hence, the MBS 100 facilitates peak shaving, ride-through, and extended operation of the MBS 100. In one or more embodiments, the peak demand may be partially provided by the battery 114 and partially provided by the AC power source 106. Further, in one or more embodiments, the battery 114 may be electrically connected to a solar power module (not illustrated), where the solar power module may be configured to supply DC electrical power to the battery 114.

In one or more embodiments, the controller 120 may include one or more processors coupled to a memory storing instructions executable by the processors, which may cause the controller 120 to perform one or more designated operations. The controller 120 may further include one or more electrical sensors to monitor the attributes associated with the electrical power flow through different sections of the power supply circuit 100A, electrical power supplied by the AC power source 106, and electrical power consumed by the motor 102, the HVAC system, and the associated components.

Thus, the subject disclosure provides an improved, efficient, and reliable solution to overcome the above-mentioned drawbacks, limitations, and shortcomings associated with existing magnetic bearing systems and associated power supply circuit 100A. The subject disclosure provides power peak shaving, and robustness against the external power source (electrical grid), and allows extended periods of operation of the MBS 100 without the grid.

It should be obvious to a person skilled in the art that the design of the power convertor/rectifier 108, the inverter 110, and the DC-DC convertors 116, 118 may be realized using a wide array of semiconductor or power-electronic devices available in the art including, but not limited to, diodes, transistors, metal-oxide-semiconductor field-effect transistor (MOSFETs), or IGBTs, without any limitations, however, the primary operation of the corresponding components remains the same.

In the context of DC-DC converters 116, 118, the term "voltage source mode" typically refers to the operational mode where the DC-DC converter regulates its output to maintain a constant voltage, regardless of variations in load current (within its specified capability). This can be achieved through various topologies and control strategies, including buck, boost, buck-boost, and other more complex configurations like single-ended primary-inductor converter (SEPIC) or Cuk converters, depending on the desired input-output voltage relationship and efficiency requirements. In voltage source mode, the primary design goal is to achieve a stable and accurate output voltage, which necessitates precise control over the switching elements (e.g., MOSFETs, IGBTs) and the use of feedback loops that typically incorporate voltage sensing and error correction mechanisms. This ensures that the DC-DC converter may respond dynamically to varying conditions, providing a reliable and constant voltage supply to the load.

In the context of DC-DC convertors, the "current source mode" focuses on regulating the output current, ensuring it remains constant regardless of changes in the load resistance or input voltage, within the converter's operational limits. This mode is particularly important for applications that demand a steady current supply, such as charging batteries, where current control is critical to the operation or safety of the system. In current source mode, the DC-DC converter employs control mechanisms that adjust the power transfer process to maintain a constant output current. This involves modulating the duty cycle of the switching elements within the DC-DC converter (such as transistors or MOSFETs) based on feedback related to the output current. The DC-DC converter thus acts as a current regulator, dynamically responding to variations in load or input conditions to keep the output current stable. To implement current source mode, DC-DC converters use various topologies like the constant current buck, boost, or buck-boost converters, among others, each selected based on the specific requirements of the application, such as the desired direction of current flow relative to the voltage levels at the input and output. These DC-DC converters are designed with feedback loops that measure the output current, often through a current sense resistor or a hall effect sensor, and adjust the converter's operation to correct any deviation from the set current level.

While the subject disclosure has been described with reference to exemplary embodiments, it will be understood by those skilled in the art that various changes may be made and equivalents may be substituted for elements thereof without departing from the scope of the subject disclosure as defined by the appended claims. Modifications may be made to adopt a particular situation or material to the teachings of the subject disclosure without departing from the scope thereof. Therefore, it is intended that the subject disclosure not be limited to the particular embodiment disclosed, but that the subject disclosure includes all embodiments falling within the scope of the subject disclosure as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A power supply circuit for a magnetic bearing system associated with a heating, ventilation, and air conditioning (HVAC) system, the power supply circuit comprising:

a power convertor configured to be electrically connected to an alternating current (AC) power source, the power convertor configured to convert AC electrical power supplied by the power source into a direct current (DC) electrical power having first electrical attributes;

an inverter configured to be electrically connected between the power convertor and a motor associated with the HVAC system, the inverter configured to convert the DC electrical power supplied by the power convertor into another AC electrical power having second electrical attributes and correspondingly supply the another AC electrical power to the motor; and a battery, an input side of the battery electrically connected to a DC bus configured between the power convertor and the inverter, and an output side of the battery electrically connected to one or more electromagnetic bearings and a magnetic bearing control drive associated with the motor or the magnetic bearing system, wherein the battery is configured to receive and store at least a portion of the DC electrical power, wherein the battery is configured to supply the stored electrical power to the one or more electromagnetic bearings and the magnetic bearing control drive in an event of failure of supply of electrical power to the motor.

2. The power supply circuit of claim 1, wherein when the AC power source is in a healthy state, the power supply circuit is configured to enable supply of the another AC electrical power to the motor and/or supply the DC electrical power to the battery.

3. The power supply circuit of claim 1, wherein the power convertor is a rectifier, an input side of the rectifier being configured to be electrically connected to the AC power source, and an output side of the rectifier being configured to be electrically connected to an input side of the inverter and the input side of the battery via the DC bus.

4. The power supply circuit of claim 1, wherein the power supply circuit further comprises a DC-DC convertor electrically configured between the output side of the battery, and the one or more electromagnetic bearings and the magnetic bearing control drive, and wherein the DC-DC convertor is configured to convert the electrical power stored in the battery into another DC electrical power having third electrical attributes for the one or more electromagnetic bearings and the magnetic bearing control drive.

5. The power supply circuit of claim 4, wherein the power supply circuit further comprises another DC-DC convertor electrically configured between the input side of the battery and the DC bus connecting the power convertor and the inverter.

6. The power supply circuit of claim 5, wherein the another DC-DC convertor is a bi-directional DC-DC convertor that is configured to enable supply of electrical power between the power source and the battery, and further enable supply of electrical power between the motor and the battery via the inverter.

7. The power supply circuit of claim 1, wherein the power convertor is a bi-directional AC to DC convertor that is configured to convert the AC electrical power supplied by the power source into the DC electrical power for the battery and/or the inverter, and further convert the electrical power stored in the battery and/or electrical power generated by the motor into the AC electrical power for the AC power source.

8. The power supply circuit of claim 5, wherein the DC-DC convertor is operated in a voltage source mode, and wherein the another DC-DC convertor is operated in a current source mode.

9. The power supply circuit of claim 1, wherein the power supply circuit further comprises a transformer configured between the power convertor and the AC power source to step-up or step-down the AC electrical power supplied by the AC power source for the power convertor.

10. The power supply circuit of claim 1, wherein the output side of the battery is configured to be electrically connected to one or more components associated with the HVAC system, and wherein the motor is associated with a compressor or one or more fans associated with the HVAC system.

11. The power supply circuit of claim 1, wherein the power supply circuit further comprises a solar power module operatively coupled to the motor and the battery, and wherein the solar power module is configured to supply the DC electrical power to the motor and the battery.

12. A battery-based magnetic bearing system, comprising:

one or more electromagnetic bearings and a magnetic bearing control drive configured with a motor;

a power supply circuit configured with the motor, the one or more electromagnetic bearings, and the magnetic bearing control drive, wherein the power supply circuit comprises:

a power convertor electrically connected to an alternating current (AC) power source, the power convertor configured to convert AC electrical power supplied by the power source into a direct current (DC) electrical power having first electrical attributes;

an inverter electrically connected between the power convertor and the motor, the inverter configured to convert the DC electrical power supplied by the power convertor into another AC electrical power having second electrical attributes and correspondingly supply the another AC electrical power to the motor; and a battery, an input side of the battery electrically connected to a DC bus configured between the power convertor and the inverter, and an output side of the battery electrically connected to the one or more electromagnetic bearings and the magnetic bearing control drive, wherein the battery is configured to receive and store at least a portion of the DC electrical power; and a controller in communication with the motor, the one or more electromagnetic bearings and the magnetic bearing control drive, and the power supply circuit, wherein the controller is configured to enable supply of the stored electrical power from the battery to the one or more electromagnetic bearings and the magnetic bearing control drive in an event of failure of supply of electrical power to the motor.

13. The magnetic bearing system of claim 12, wherein when the AC power source is in a healthy state, the controller is configured to enable the power supply circuit to supply the another AC electrical power to the motor and/or supply the DC electrical power to the battery to store the electrical power in the battery.

14. The magnetic bearing system of claim 12, wherein the power convertor is a rectifier, an input side of the rectifier electrically connected to the AC power source, and an output side of the rectifier configured to be electrically connected to an input side of the inverter and the input side of the battery via the DC bus.

15. The magnetic bearing system of claim 12, wherein the power supply circuit further comprises a DC-DC convertor electrically configured between the output side of the battery, and the one or more electromagnetic bearings and the magnetic bearing control drive, and wherein the DC-DC convertor is configured to convert the electrical power stored in the battery into another DC electrical power having third electrical attributes for the one or more electromagnetic bearings and the magnetic bearing control drive.

16. The magnetic bearing system of claim 12, wherein the output side of the battery is further electrically connected to one or more components associated with a heating, ventilation, and air conditioning (HVAC) system, and wherein the motor is associated with a compressor or one or more fans associated with the HVAC system.

17. The magnetic bearing system of claim 12, wherein the controller is configured to adjust the supply of electrical power from the power source to the battery to a corresponding threshold level based on a request raised by the power source.

18. The magnetic bearing system of claim 12, wherein the controller is configured to limit the supply of electrical power from the power source to the battery to a corresponding threshold level upon detecting power consumption by a heating, ventilation, and air conditioning (HVAC) system and/or the magnetic bearing system to exceed the corresponding threshold level.

19. The magnetic bearing system of claim 12, wherein the controller is configured to:

enable the supply of electrical power from the power source to the battery to charge the battery upon detecting an energy supply demand of a heating, ventilation, and air conditioning (HVAC) system and/or the magnetic bearing system to be below a corresponding threshold value; and enable the supply of the electrical power stored in the battery to the HVAC system and/or the magnetic bearing system upon detecting the energy supply demand to be above the corresponding threshold value.

20. The magnetic bearing system of claim 12, wherein the controller is configured to:

enable the supply of electrical power from the power source to the battery upon detecting an energy tariff of the power source to be below a tariff threshold value; and restrict the supply of electrical power from the power source to the battery upon detecting the energy tariff of the power source to be above the tariff threshold value.

* * * * *